US 6,795,606 B2

(12) United States Patent
Döbler et al.

(10) Patent No.: US 6,795,606 B2
(45) Date of Patent: Sep. 21, 2004

(54) OPTICAL ADD-DROP MODULE WHICH CAN BE EXPANDED MODULARLY

(75) Inventors: Christian Döbler, Taufkirchen (DE); Patrick Leisching, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 325 days.

(21) Appl. No.: 09/957,367

(22) Filed: Sep. 20, 2001

(65) Prior Publication Data

US 2002/0044735 A1 Apr. 18, 2002

(30) Foreign Application Priority Data

Sep. 20, 2000 (DE) .......................................... 100 46 585

(51) Int. Cl.[7] .............................. G02B 6/28; G02B 6/42; G02B 6/26
(52) U.S. Cl. ........................................... 385/24; 385/16
(58) Field of Search ............................. 385/24, 18, 87, 385/16; 359/127, 618, 124

(56) References Cited

U.S. PATENT DOCUMENTS

| | | | |
|---|---|---|---|
| 6,429,974 B1 * | 8/2002 | Thomas et al. | ............. 359/618 |
| 2002/0015552 A1 * | 2/2002 | Link et al. | ..................... 385/24 |
| 2002/0135838 A1 * | 9/2002 | Way | ............................ 359/127 |

* cited by examiner

Primary Examiner—Chandrika Prasad
(74) Attorney, Agent, or Firm—Bell, Boyd & Lloyd LLC

(57) ABSTRACT

In a first ADD-DROP module, a WDM signal is supplied to a first filter arrangement which selects two channels and supplies the remaining channels to a cascading switching device. The channels selected by the first filter device can be dropped by an ADD-DROP switching device or switched through the module. The ADD channels switched through or newly added are combined with the remaining channels in an ADD filter arrangement to form a newly configured WDM output signal. A further ADD-DROP module (M2) which allows two further channels to be dropped and added can be connected, in turn, via cascading terminals.

14 Claims, 2 Drawing Sheets

OPTICAL ADD-DROP MODULE WHICH CAN BE EXPANDED MODULARLY

BACKGROUND OF THE INVENTION

The present invention relates to an optical ADD-DROP module which can be expanded modularly.

When possible, wavelength-division multiplex systems (WDM systems) and dense wavelength-division multiplex systems (DWDM systems) are implemented as purely optical systems for cost reasons. In these systems, in order to extract individual channels, or more precisely for extracting signals of a particular wavelength, and to add channels (signals of the same wavelength) it is necessary to provide ADD-DROP multiplexers. To allow flexibility in responding to customer requirements, it must be possible to configure the injection and extraction of wavelengths remotely. It is also desirable that such operations are performed with minimum intervention in the system.

Until now, static ADD-DROP modules have been developed and are preferred. Marconi produces an ADD-DROP multiplexer in which a supplied WDM signal is split into parallel channels which are either switched through or are extracted and injected. The channels are combined again at the output of the ADD-DROP multiplexer via a WDM multiplexer. A drawback to this concept, is that with this arrangement it is not possible to expand the ADD-DROP capacity.

It is also known to connect a number of ADD-DROP modules in series. In this case, however, uninterruptable expansion is not possible. A serious disadvantage of this arrangement, however, is the high insertion loss.

SUMMARY OF THE INVENTION

It is the object of the present invention to specify an expandable ADD-DROP module with low insertion loss.

This object is accomplished by an optical ADD-DROP module according to the present invention. In an embodiment of the invention, the optical ADD-DROP module is modularly expandable such that additional ADD-DROP modules may be cascaded as necessary to meet requirements. An ADD-DROP module according to the invention includes a first filter arrangement. A WDM signal is supplied to the first filter which selects at least one droppable channel from the input WDM signal and passes the remaining channels to a second filter device. The ADD-DROP module includes at least one ADD-DROP switching device. The droppable channel selected by the first filter arrangement is supplied to at least one ADD-DROP switching device, and the ADD-DROP switching device has changeover switches for either switching the selected droppable channel through, or for dropping and adding a corresponding channel.

Meanwhile, channels to be looped through from the first filter arrangement are supplied to a cascading switching unit. The cascade switching unit either switches the channels through or supplies them to cascading terminals which may be connected to a second ADD-DROP module essentially identical to the first. When an additional ADD-DROP module is connected to the cascading terminals, the cascade switching unit may supply the additional looped through channels to second the ADD-DROP module and receive the WDM signal output therefrom. An ADD filter arrangement is provided in the first ADD-DROP module for combining the droppable channels and the channels to be looped through from the first ADD-DROP module, as well as the WDM signal output from the second cascaded ADD-DROP module if such a second module is necessary. The combined droppable channels and the channels looped through the first ADD-DROP module and the WDM signal output from second ADD-DROP module form a newly configured WDM output signal.

The special advantage of the ADD-DROP module of the present invention lies in the fact that the signals "to be looped through" which are not supplied to ADD-DROP switching units, are only slightly attenuated. They can be supplied to another ADD-DROP module of at least approximately the same configuration via the cascading switching unit.

An ADD-DROP module with drop capabilities for two channels is particularly advantageous. This ADD-DROP capacity is usually adequate in a great number of cases. However, in those cases when two channel capacity is insufficient, expansion with another module as provided by the ADD-DROP module of the present invention results in an ADD-DROP capacity of four channels which is always sufficient for almost all applications.

A wavelength-division demultiplexer which has passbands of different widths can be used as the filter unit for selecting the ADD-DROP channels. This demultiplexer can also be advantageously constructed of individual optical filters, preferably as a Bragg grating. In these filters, the reflected waveband is attenuated only slightly and can, therefore, be supplied to the cascaded ADD-DROP module.

Further, the optical switching units used are preferably 2:2 switches in which the signals from two inputs can be arbitrarily switched through to two outputs.

To obtain similar signal levels in all channels, it is appropriate to provide optical attenuating sections in the signal paths. This applies particularly to the signal path of the channels to be looped through, which cannot be dropped. It is particularly advantageous in this arrangement to insert a constant-value optical attenuation section into the signal path of the looped through channels and to connect variable attenuation sections in series with the ADD-DROP switching units. Also the selection of the dropped channels can be improved further by an additional filter.

Additional features and advantages of the present invention are described in, and will be apparent from, the following Detailed Description of the Invention and the figures.

DETAILED DESCRIPTION OF THE INVENTION

Figure 1:
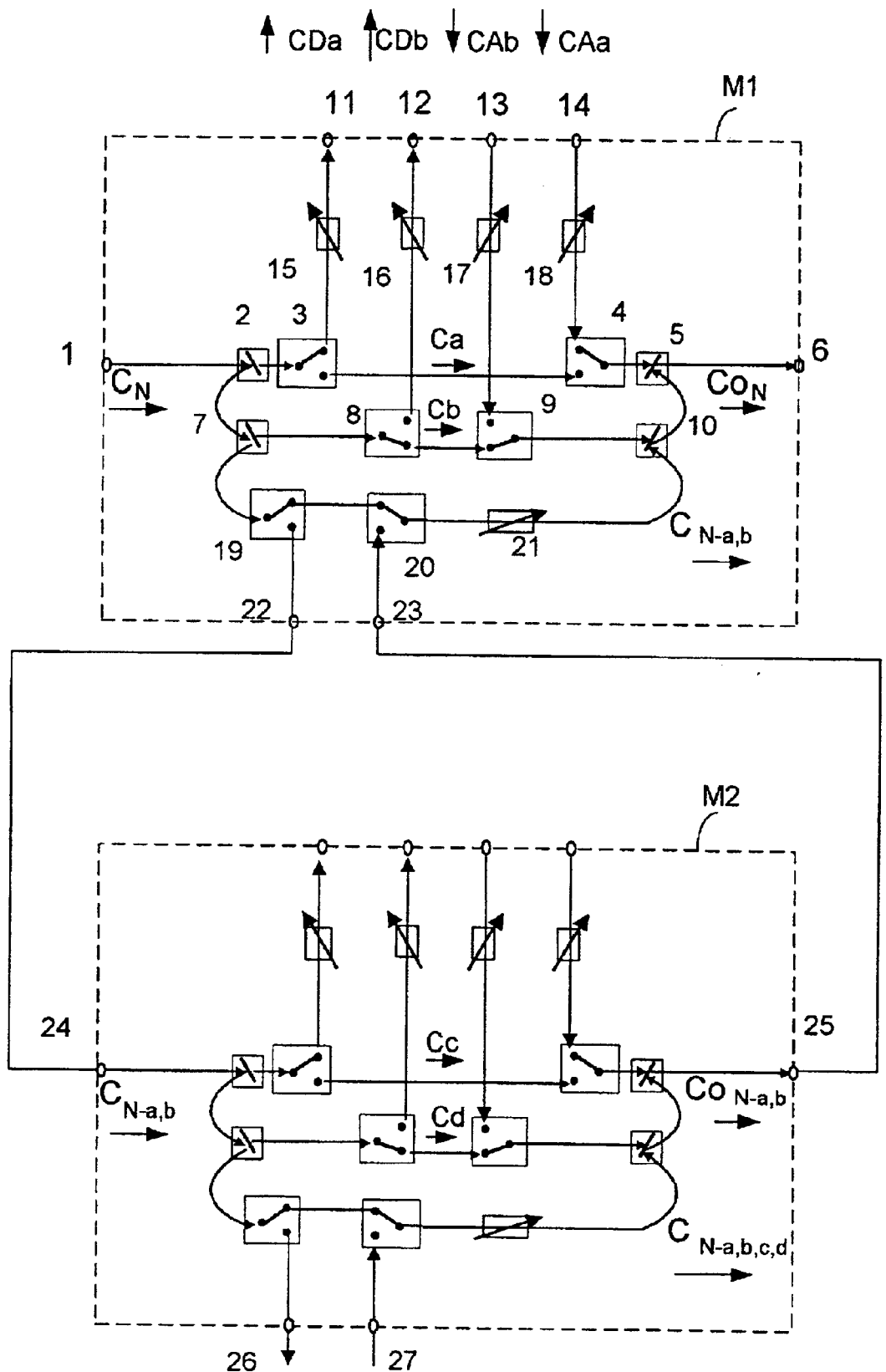
FIG. 1 is a basic circuit diagram of the invention.

In FIG. 1 two ADD-DROP modules M1 and M2 according to the present invention are shown. Both modules are constructed identically and, therefore, only the components of the first module have been provided with reference symbols. A WDM signal input 1 is supplied with a WDM signal $C_N$ having N channels. The input signal $C_N$ passes to a first channel filter 2 which selects one channel $C_a$ which is passed through to an ADD-DROP switching device 3, 4 and supplies the remaining N-a channels to a further channel filter 7. The channel filter 7 selects a further channel $C_b$ which is passed through to an ADD-DROP switching device 8, 9. The remaining N-a-b channels $C_{N-a,b}$ are supplied to a cascading switching unit 19, 20.

As mentioned, each droppable channel $C_a$, $C_b$ is supplied to an ADD-DROP switching device 3, 4 and 8, 9, respectively. This is shown symbolically by means of two optical changeover switches 3, 4 and 8, 9, respectively which, however, are constructed as 2:2 switches. The first changeover switch 3 provides for the dropping of channel $C_a$ which is then designated as drop channel $CD_a$, or for the switching-through of this channel. Correspondingly, the changeover switch 4 provides for the adding of an ADD channel $CA_a$ or for the switching-through (looping-through) of channel Ca. This correspondingly applies to the ADD-DROP switching unit 8, 9 which either switches through the channel $C_b$ or drops the channel $C_b$ as drop channel $CD_b$, and provides for the adding of a corresponding channel $C_{ab}$, or the looping through of channel $C_b$.

The channels $C_{N-a-b}$ which are to be looped through are conducted via the cascading switching unit 19, 20. In the switch position shown in FIG. 1, the channels $C_{N-a-b}$ are routed through an attenuation section 21 and ADD filter 10 and WDM multiplexer 5 where they are combined with the droppable or added channels to form the WDM output signal $C_{ON}$ which then passes to the WDM signal output 6.

Since the attenuation of the channels $C_{N-a,b}$ which are to be looped through via the cascading switching unit 19, 20 is less than that of the droppable channels $C_a$, $C_b$, an optical attenuation section 21 is arranged within the signal branch of the channels $C_{N-a,b}$. Correspondingly, the levels of the DROP channels and of the ADD channels can be adjusted by attenuation sections 15 to 18.

If the ADD-DROP capacity of the module M1 becomes insufficient, the WDM signal input 24 and WDM signal output 25 of a second ADD-DROP module M2, are connected to the cascading terminals 22, 23 of the first ADD-DROP module M1. The second ADD-DROP module M2 is constructed substantially identically to the first ADD-DROP module M2. By operating the optical changeover switches 19 and 20 of the cascading switching unit, the channels $C_{N-a,b}$ previously looped through the first ADD-DROP module now pass to input 24 of the second ADD-DROP module M2. Of these channels, two further channels $C_c$, $C_d$ are supplied to two further ADD-DROP devices which can either drop or switch through these channels. The ADD channels switched through or, respectively, newly added by the second module are combined with the channels $C_{N-a,b,c,d}$ which are looped through the second ADD-DROP module to form a multiplex signal $C_{ON-a,b}$. The multiplex signal $CO_{N-a,b}$ is supplied to the cascading terminal 23 of the first ADD-DROP module M1 and is combined with the signals looped through or added by the first ADD-DROP module via the ADD filters 10 and 5 to form the newly configured WDM output signal $C_{ON}$. Further, cascading can be carried out via terminals 26 and 27 of the second module.

Figure 2:
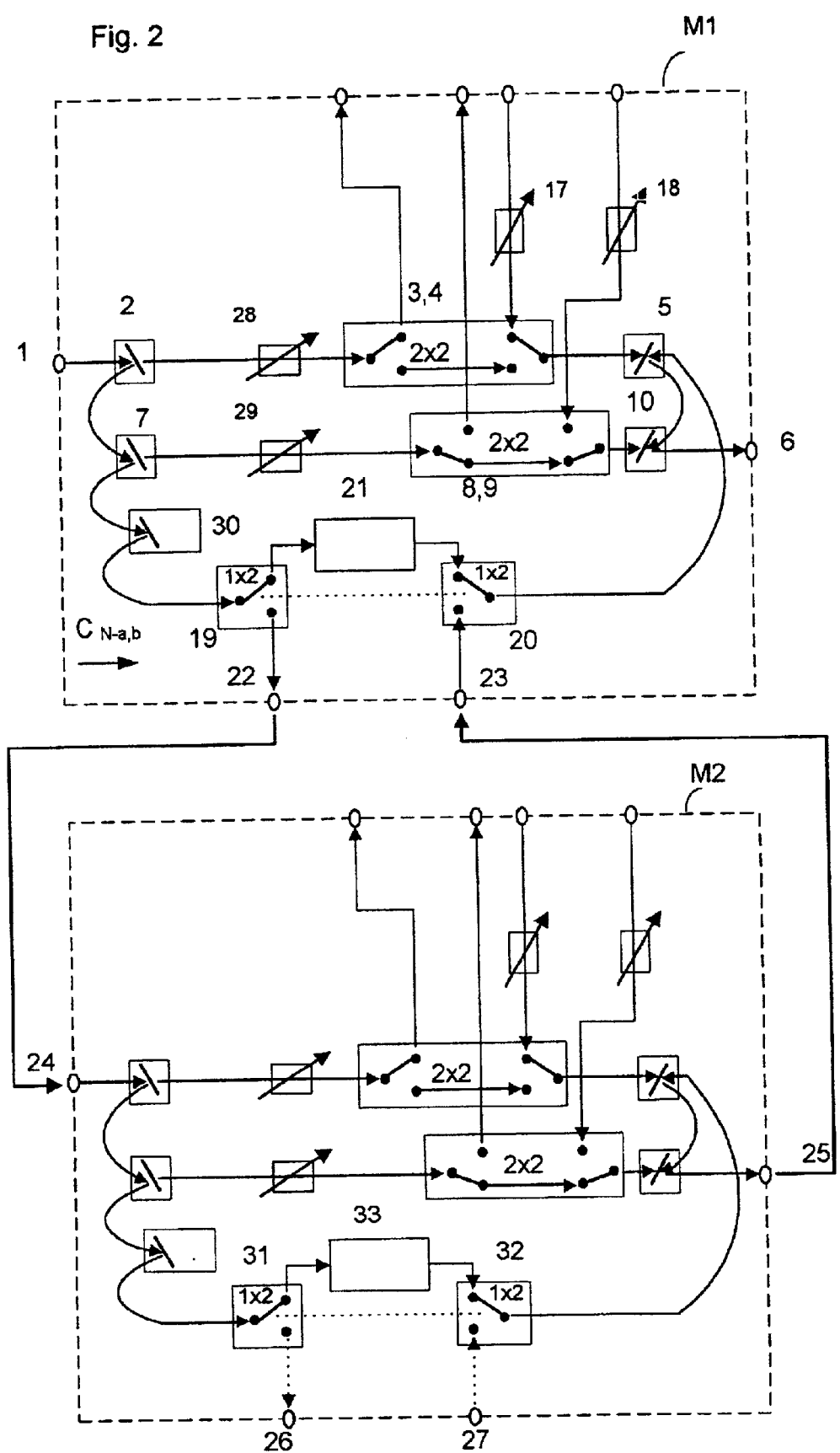
FIG. 2 is a circuit diagram of a preferred exemplary embodiment of the invention.

FIG. 2 shows a preferred exemplary embodiment of the invention. The changeover switches 3 and 4 and, respectively, 8 and 9 are replaced by 2:2 switches 3, 4 and, respectively, 8, 9. The channels $C_{N-a,b}$ to be looped through in the first module are conducted via a further band pass filter 30 which improves the attenuation of the droppable channels $C_a$ and $C_b$. If no cascading is carried out, the optical attenuation section 21 is inserted as a fixed-value attenuation section between the changeover switches 19 and 20. The remaining channel levels are adapted by means of variable attenuation sections 28 and 29 which are connected in series with the ADD-DROP switching devices 3, 4 and 8, 9, respectively. Since attenuation problems occur with further cascading in the current state of the art, the cascading switching device 31, 32 of the second module can be omitted and the channels to be looped through can be conducted directly via an attenuation section 33. In that case, the cascading terminals 26, 27 may be omitted.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A modularly expandable optical ADD-DROP module comprising:
    a first filter arrangement adapted to receive a wavelength-division multiplex (WDM) signal having a plurality of channels and select at least one droppable channel from said plurality of channels of said WDM signal;
    at least one ADD-DROP switching device having a changeover switch for switching the channel selected and adding a corresponding channel;
    a cascading switching unit adapted to receive the WDM signal containing one or more channels not selected by said first filter arrangement, said cascading switching unit acting to switch said WDM signal through said module or supply the WDM signal to a second substantially identical modularly expandable ADD-DROP module; and
    an ADD filter arrangement for combining the at least one droppable channel, the one or more channels not selected by said by said first filter arrangement to be looped through the first ADD-DROP module, and if necessary, the droppable channels and the non-selected channels to be looped through the second ADD-DROP module to form a newly configured WDM output signal.

2. the modularly expandable ADD-DROP module of claim 1, wherein the filter arrangement is configured to select a first droppable channel and a second droppable channel.

3. The modularly expandable ADD-DROP module of claim 2 wherein said first filter arrangement and said ADD filter arrangement comprise cascaded individual filters.

4. The modularly expandable ADD-DROP module of claim 3, wherein said ADD-DROP switching device comprises an optical 2:2 switch (3, 4; 8, 9).

5. The modularly expandable ADD-DROP module of claim 4, further comprising an optical attenuation section arranged in a signal path of the WDM signal containing channels not selected by said first filter arrangement which are channels ($C_{N-a,\ b}$) to be looped through said module.

6. The modularly expandable ADD-DROP module of claim 5, further comprising adjustable attenuation sections connected in series with said ADD-DROP switching devices.

7. The modularly expandable ADD-DROP module of claim 6, further comprising an attenuating filter for attenuating the at least one droppable channel connected in series with the cascading switching unit.

8. The modularly expandable ADD-DROP module of claim 7, wherein the optical attenuation section is inserted between a first output of a first changeover switch and a first output of a second changeover switch of the cascading switching unit.

9. The modularly expandable ADD-DROP module of claim 1 wherein said first filter arrangement and said ADD filter arrangement comprise cascaded individual filters.

10. The modularly expandable ADD-DROP module of claim 1, wherein said ADD-DROP switching device comprises an optical 2:2 switch (3, 4; 8, 9).

11. The modularly expandable ADD-DROP module of claim 1, further comprising an optical attenuation section arranged in a signal path of the WDM signal containing channels not selected by said first filter arrangement which are channels ($C_{N-a,\ b}$) to be looped through said module.

12. The modularly expandable ADD-DROP module of claim 1, further comprising adjustable attenuation sections connected in series with said ADD-DROP switching devices.

13. The modularly expandable ADD-DROP module of claim 1, further comprising an attenuating filter for attenuating the at least one droppable channel connected in series with the cascading switching unit.

14. The modularly expandable ADD-DROP module of claim 1, wherein the optical attenuation section is inserted between a first output of a first changeover switch and a first output of a second changeover switch of the cascading switching unit.

* * * * *